March 21, 1961
O. G. LANDSVERK ET AL
2,976,420
DOSIMETER CHARGING SWITCHES
Filed Aug. 12, 1958
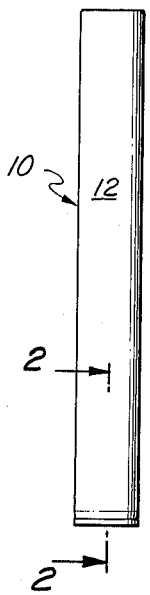
FIG. 1.
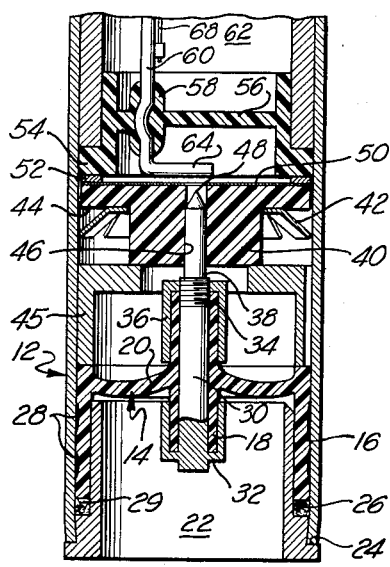
FIG. 2.
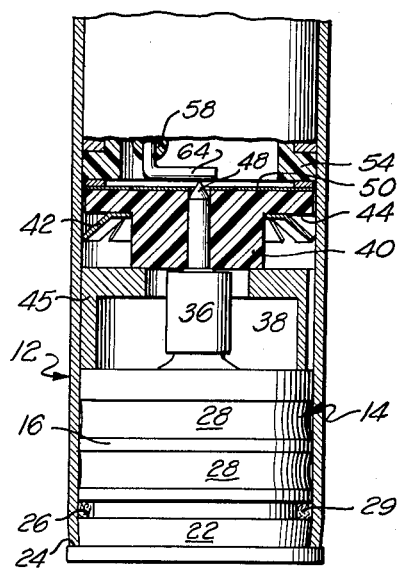
FIG. 3.
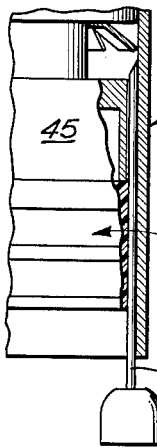
FIG. 4.
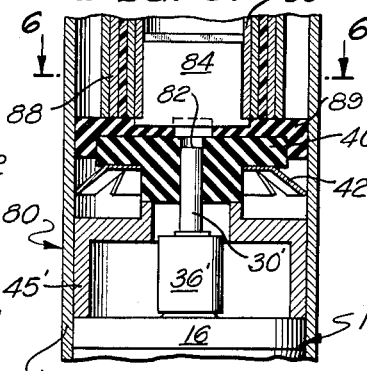
FIG. 5.
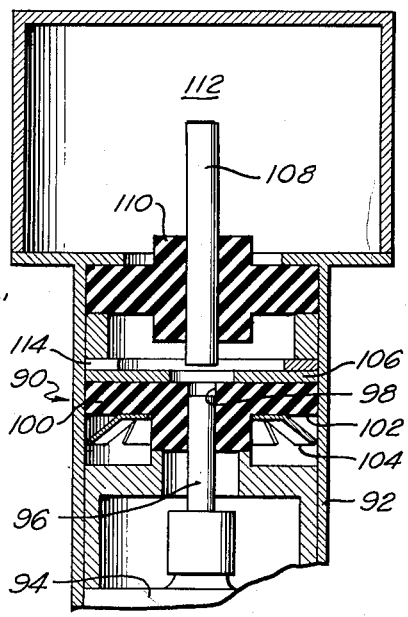
FIG. 6.
FIG. 7.

United States Patent Office 2,976,420
Patented Mar. 21, 1961

2,976,420
DOSIMETER CHARGING SWITCHES

Ole G. Landsverk, Glendale, Zenonas Glodenis, Los Angeles, and Delbert L. Merriner, Glendale, Calif., assignors to Landsverk Electrometer Company, Glendale, Calif., a corporation of California Filed Aug. 12, 1958, Ser. No. 754,670

11 Claims. (Cl. 250—83.3)

This invention pertains to new and improved dosimeter charging switches.

The term "dosimeters" is employed in this specification in a broad sense so as to indicate any of several different types of apparatus used to measure exposure to radioactive radiation such as, for example, X-ray of gamma rays. Such dosimeters employ ionization chambers and are designed to measure a difference in electrical charge caused by the ionization of gases within this chamber. In conventional roentgen meters the difference in charge is measured between electrodes, one of which is commonly called a collecting electrode. In conventional quartz fiber dosimeters the difference in charge is determined by the amount of deflection of a quartz fiber within the ionization chamber caused by ionization. These quartz fiber meters are the direct reading type; in this case normally they include a microscope and a reticle assembly so that the position of the quartz fiber may be visually determined.

A broad object of this invention is to provide new and improved charging switches for dosimeters of the broad categories briefly indicated above. A closely related object of this invention is to provide dosimeter charging switches which may be manufactured at a comparatively low cost and which are very simple to assembly within a complete instrument.

A more important object of the present invention is, however, to provide dosimeter charging switch structures which are hermetically sealed with respect to a dosimeter itself. This is important because of the fact that the ionization of gases within an ionization chamber in a dosimeter will vary depending upon the specific gas content of such a chamber. Obviously if uniform readings are to be achieved with any dosimeter the specific gas content within the instrument must remain constant.

Another important objective of this invention is to provide dosimeter charging switches which are capable of withstanding severe shock. Various types of dosimeters, and especially dosimeters which are adapted to be carried on the person of an individual, may on many occasions be subjected to severe shock as by being dropped or the like. For any dosimeter to provide adequate protection under such circumstances it must be capable of withstanding such shock without partial or full discharge of the dosimeter.

A still further object of the present invention is to provide charging switches for quartz fiber or similar dosimeters in which the amount of electrostatic induction from the switch to the collecting electrode upon which the quartz fiber is mounted is very low. The purpose of this object of the invention is to provide dosimeters of the type indicated in which the so-called "charging kick" resulting in a sudden shift of the quartz fiber is avoided by providing a structure in which the potential in the quartz fiber voltmeter assembly changes only slightly during the charging operation when the charging switch is returned to its normal position and is discharged.

A still further object of this invention is to provide a dosimeter charging switch which is utilized in conjunction with a quartz fiber voltmeter assembly so that the clearance between this switch and the assembly is automatically adjusted to a desired value and so that this clearance remains in adjustment as the instrument is used.

Still further objects of the invention and many advantages of it will be fully apparent from a detailed consideration of the remainder of this description including the appended claims and accompanying drawing in which:

Fig. 1 is a side elevational view of a dosimeter employing a charging switch of this invention;

Fig. 2 is a cross sectional view taken at line 2—2 of Fig. 1;

Fig. 3 is a cross sectional view similar to Fig. 2 in which certain parts of the charging switch are shown in elevation and in which this charging switch is illustrated during its use;

Fig. 4 is a partial cross sectional view, similar to Fig. 3, indicating a step in manufacturing a dosimeter of the type indicated in the preceding figures;

Fig. 5 is a partial cross sectional view similar to Fig. 2 of a high range capacitor type quartz fiber dosimeter;

Fig. 6 is a cross sectional view taken at line 6—6 of Fig. 5; and

Fig. 7 is a cross sectional view similar to Fig. 2 of a low range, indirect reading dosimeter, such as is frequently referred to as a roentgen meter.

Whenever convenient for purposes of illustration and explanation, like numerals are used to designate like parts in various figures of the accompanying drawing. It is to be understood that this drawing is intended to illustrate a presently preferred charging switch of this invention employed in several different types of dosimeters. Those skilled in the art to which this invention pertains will realize that charging switches as herein described may be changed in a number of different manners in accordance with normal engineering practice and that they may be employed in a number of differently constructed dosimeters.

The invention is best more fully explained by referring directly to the accompanying drawing. In Fig. 1 there is shown a complete dosimeter 10 of the so-called quartz fiber type. Suitable dosimeters of this broad category are shown in the Landsverk Patent No. 2,648,777 and in the co-pending application, Serial No. 645,059, filed March 3, 1957, now abandoned.

This dosimeter 10 includes a tubular metal housing 12 within the upper end of which there is mounted a microscope and a reticle assembly (neither shown) of the general type shown in this patent and in this application. The lower end of the housing 12 contains a diaphragm member 14 which is preferably formed out of a flexible, electrically non-conductive material so as to include an outer cylinder 16 and an inner cylinder 18, these cylinders being connected by a flexible, imperforate diaphragm 20. The complete diaphragm member is preferably formed out of a light transmitting material such as, for example, a common grade of polyethylene or another similar organic polymer by conventional injection molding techniques so that it can serve to transmit light into the interior of the housing 12 so as to facilitate reading the dosimeter 12.

The outer cylinder 16 is preferably held against the inside of an end of the housing 12 by means of a tubular sleeve 22 formed out of metal so as to have flanges 24 and 26 located therein. The outer flange 24 is adapted to rest against the end of the housing 12 so as to accurately space this sleeve in position while the inner flange 26 provides for spacing the principal portion of the sleeve 22 on the interior of the outer cylinder 16. Preferably the sleeve 22 is of such dimension as to normally hold this outer cylinder 16 under compression against the interior of the housing 12 so as to form a seal between this outer cylinder 16 and the housing 12 at all times.

In order to aid in forming a seal, it is preferred to provide a series of grooves 28 on the outside of the cylinder 16. Such grooves permit a certain amount of "give" between the cylinder 16 and the housing 12 as this cylinder is held under compression and thus aid in achieving a satisfactory sealing action. It is normally preferred to coat the outer cylinder 16 with an inert, non-volatile grease 29 such as, for example, a known high vacuum silicone grease in order to further aid in the formation and maintenance of such a seal. Such a grease also aids in assembly of the complete dosimeter 10 and serves to prevent any chance of undesired air passages being located between the sleeve 22, the cylinder 16 and the housing 12.

Preferably a similar grease is located around a charging pin 30 formed out of metal and positioned so as to extend through the inner cylinder 18. This charging pin has a cap-like end 32 formed as an integral part of it which fits around the exterior of the cylinder 18 so as to securely hold this cylinder under compression against the principal portion of the pin 30. A part 34 of the pin 30 is also preferably threaded. A cap 36 having a threaded opening formed therein is mounted upon this part 34 so as to hold the other end of the cylinder 18 under compression in a similar manner against the principal portion of the pin 30. If desired, various grooves (not shown) similar to the grooves 28 may be provided on the cylinder 18 between the pin 30 and the caps 32 and 36.

The pin 30 has a shoulder 38 formed thereon which is adapted to abut against a guide sleeve 40 formed out of a light transmitting non-conductive material. As is shown this sleeve 40 fits closely within the interior of the housing 12 and is held in place by means of a ring-like fastener 42 which engages the interior of the housing 12 and a flange 44 formed on the sleeve 40. A spacing sleeve 45 is located beween the guide sleeve 40 and an end of the outer cylinder 16 in order to aid in positioning the diaphragm member 14 within the housing 12.

The sleeve 40 also includes a centrally located opening 46 formed therein within which the charging pin 30 is slidably positioned so that a pointed end 48 of this charging pin is normally located between the sides of the sleeve 40. The upper side is preferably covered with a translucent or transparent electrically conductive coating 50 such as may be applied to the sleeve 40 by various known vacuum metallizing techniques. This coating is electrically connected to the housing 12 through the use of a metal spacing ring 52 engaging both it and the housing 12 and serves as an electrostatic shield.

In the dosimeter 10 an insulator 54 is positioned against the spacing ring 52 and extends into the interior of the housing 12 so as to include a transparent web 56 holding a cylinder 58 which in turn supports a metal voltmeter frame 60. This voltmeter frame 60 extends on the side of the web 56 away from the sleeve 40 into an ionization chamber 62 formed within the housing 12 by various parts not specifically indicated in the drawing of a type shown in the aforenoted patent and application. A bent end 64 of the frame 60 extends through the cylinder 58 so as to be held thereby and so as to terminate within the housing 12 a short distance from the coating 50.

With this construction when the charging pin 30 is pushed forward within the housing 12 the diaphragm 20 will flex, and the pointed end 48 of the charging pin will project from the sleeve 40 so as to abut against the end 64 of the frame 60. As this occurs the end 64 of this frame will be bent slightly so that electrical contact is established between it and the charging pin 30. Because of the fact that the frame 60 is preferably formed out of a somewhat resilient, easily bent metal, such as, for example, aluminum, if this end 64 is not in the proper location when the charging pin 30 is moved in this manner, this end will be bent to a proper position by the charging pin 30. After this occurs whenever the charging pin 30 is used a desired contact will be established between the charging pin 30 and the end 64 by virtue of the pointed end 48 of the charging pin 30 hitting against this end 64 so as to cause it to "give" slightly.

When the charging pin 30 is moved in this manner, the movement of the charging pin is limited by means of the shoulder 38 on it hitting against the sleeve 40. If for any reason the sleeve 40 should become worn so as to permit other than the initial amount of charging pin travel, a proper contact between the charging pin 30 and the end 64 of the frame 60 will be achieved still by virtue of the fact that this end 64 will bend slightly as described above.

An important factor with the dosimeter 10 lies in the fact that the coating 50 acts as a shield to block off the electrostatic field from the charging pin 30. Thus, with this construction the capacitance between the end 64 of the frame 60 and the charging pin 30 is kept at a minimum, and as a result undesired motion of a quartz fiber 68 attached to the frame 60 occurring when the pin 30 is released so as to resume its initial position is kept at a minimum. The pointed end 48 of the charging pin 30 aids in accomplishing this result since with such an end the capacity between it and the end 64 is very small. It essence, very little "kick" or movement is applied to this fiber 68 as the charging pin 30 is removed from the end 64 of the frame 60. Very little kick also results from subsequent complete discharge of pin 30. Because of the fact that the charging pin 30 utilizes the pointed end 48 and because of the fact that the end 64 of the frame 60 is resilient, the pointed configuration of the end 48 of the charging pin 30 is maintained as the dosimeter 10 is used.

During the assembly of the dosimeter 10, before the sleeve 22 is placed in position it is possible to insert around the outer cylinder 16 of the diaphragm member 14 a small hypodermic needle 70 as indicated in Fig. 4 of the drawing and to use this hypodermic needle in introducing a desired gas mixture within the dosimeter 10. After the dosimeter 10 has been filled in this manner, the needle 70 may be withdrawn and the sleeve 22 inserted and secured in place to the housing 12 without any substantial or material amount of gas intermixture between the air and the gas introduced into the dosimeter 10. Thus, with this construction it is possible to provide a hermetically sealed instrument without the necessity of using conventional seals or other conventional joints.

In Fig. 5 of the drawing there is shown a part of a modified dosimeter 80 which is substantially identical with the dosimeter shown in the aforenoted application for U.S. Letters Patent, Serial No. 645,059. Those parts of the dosimeter 80 which are substantially identical to parts of the dosimeter 10 previously described are, for convenience of designation, designated by the primes of the numerals previously employed.

This dosimeter 80 differs from the dosimeter 10 in that the charging pin 30' has a square end 82 instead of a pointed end 48. When the charging pin 30' is moved this end 82 abuts against a wedge shaped plate 84 located within a tube 86 attached to the inner electrode of a capacitor 88. This tube 86, is, with this construction, connected to a frame (not shown) similar to the frame 60 previously described. The frame carries a quartz fiber (not shown). With the dosimeter 80 the guide sleeve 40' does not carry any conductive coating such as the coating 50 shown inasmuch as with this type of dosimeter the capacitance of the condenser 88 is sufficiently large that the effects of the electrostatic induction between the charging pin 30' and the plate 84 are substantially negligible. If desired the guide sleeve 40' may be formed in two parts as shown, the second part 89 of which serves as a condenser insulator.

In Fig. 7 of the drawing there is shown a roentgen meter 90 employing a form of this invention. This roentgen meter 90 includes a housing 92 corresponding to the housing 12 previously described. In the lower end of this housing a diaphragm member 94 which is identical to the diaphragm member 14 previously described, is mounted so that a charging pin 96 corresponding to the charging pin 30 extends from it through an opening 98 in a non-conductive guide sleeve 100. This sleeve, includes a flange 102 which is held in place within the housing 92 by means of a retainer or fastener 104 corresponding to the fastener 42 previously indicated. Because in this type of instrument there is no need for a transparent electrostatic shield, with the roentgen meter 90 a metal washer 106 is located around the opening 98 in the guide sleeve 100 so as to provide adequate shielding between the charging pin 96 and a collecting electrode 108.

This collecting electrode 108 is held by a non-conductive sleeve 110 so as to be insulated from the walls of an ionization chamber 112 formed on the end of the housing 92. If desired, a metal split-ring 114 can rest against the washer 106 so as to firmly establish electrical contact between it and the housing 92. With the roentgen meter 90 the end of this instrument containing the diaphragm member 94 is substantially identical to the corresponding part of the dosimeter 10.

Those skilled in the art to which this invention pertains will realize that dosimeter charging switches of the type set forth in this specification may be modified in a number of ways in accordance with routine engineering skill so as to adapt them for use with various specific types of instruments, such as, for example other types of dosimeters than the specific varieties shown. For this reason this invention is to be considered as being limited only by the appended claims forming a part of this disclosure.

We claim:
1. In a dosimeter having a tubular housing end and a charging pin movably mounted within said end, a structure for sealing said tubular end and for holding said charging pin which comprises: a diaphragm member formed out of a flexible, electrically non-conductive material so as to have an outer cylinder, an inner cylinder spaced from said outer cylinder, and a diaphragm extending between said cylinders, said outer cylinder fitting closely against the inside of said tubular end, said charging pin fitting within said inner cylinder so as to extend therefrom into said tubular end; a sleeve located within said outer cylinder so as to hold said outer cylinder against the interior of said tubular end in a sealed relationship therewith; cap means attached to said charging pin at each end of said interior cylinder, each of said cap means engaging the outside of said inner cylinder so as to hold said inner cylinder in a sealed relationship with said charging pin.

2. In a dosimeter, a structure as defined in claim 1 wherein said diaphragm member is formed so as to have a series of grooves located on the exterior of said outer cylinder, said grooves fitting against the interior of said tubular end.

3. In a dosimeter, a structure as defined in claim 1 including an inert, non-volatile grease located on said outer cylinder between said tubular end and said sleeve and located on said inner cylinder between said inner cylinder, said charging pin and each of said cap means.

4. A dosimeter as defined in claim 1 wherein the exterior of said outer cylinder fitting against the interior of said housing is provided with a series of grooves formed thereon, and wherein a non-volatile grease is located between said outer cylinder and said housing and said sleeve, and between said inner cylinder, said charging pin and each of said cap means.

5. A dosimeter which includes: a tubular metal housing having an end; a diaphragm member formed out of a flexible, electrically non-conductive material so as to have an outer cylinder fitting against the interior of said housing adjacent to said end, and an inner cylinder located within said housing so as to be spaced from said end, and a flexible, impervious diaphragm connecting said cylinder so that said inner cylinder may be moved away from said end of said housing; a sleeve fitting against the interior of said outer cylinder so as to hold said outer cylinder in sealed relationship with said housing; a metal charging pin extending through said inner cylinder into said housing; separate cap means attached to said charging pin at each of the ends of said inner cylinder, said cap means each engaging the outside of said inner cylinder in sealed relationship with said charging pin; an electrode terminal mounted within said housing so as to be insulated from said housing, said electrode terminal extending to adjacent to said charging pin so that said terminal is capable of being engaged by said charging pin when said charging pin is moved away from said end of said housing.

6. A dosimeter as defined in claim 5 including an inert, non-volatile grease located between said outer cylinder and said sleeve and said housing, and located between said inner cylinder, and said charging pin and said cap means.

7. A dosimeter as defined in claim 5 including groove means located upon the exterior of said outer cylinder fitting against the interior of said housing.

8. A dosimeter which includes: a tubular metal housing; an electrically non-conductive guide sleeve positioned within the interior of the housing so as to have ends located extending across the interior of said housing, said ends of said sleeve being connected by an opening extending through said sleeve; an electrode terminal located within said housing adjacent to one of said ends of said sleeve and to said opening; an electrically conductive material located on said end of said sleeve adjacent to said terminal, said material extending around said opening, being electrically connected to said housing, and being spaced from said terminal; a charging pin slidably mounted within said opening, said charging pin being capable of being moved with respect to said sleeve so as to contact said terminal.

9. A dosimeter which includes: a tubular metal housing; an electrically non-conductive guide sleeve positioned in the interior of said housing so as to have ends located extending across the interior of said housing, said ends of said sleeve being connected by an opening extending through said sleeve; a resilient metal electrode terminal located within said housing adjacent to one of said ends of said sleeve and to said opening; an electrically conductive material located on the surface of said sleeve adjacent to said terminal, said material extending around said opening, being electrically connected to said housing, and being spaced from said terminal; a charging pin slidably mounted within said opening, said charging pin having a pointed end capable of contacting said electrode terminal when said charging pin is moved with respect to said sleeve toward said terminal, causing said terminal to deform.

10. A dosimeter which includes: a tubular metal housing having an end; a flexible diaphragm capable of transmitting light extending across the interior of said end of said housing; an electrically non-conductive guide sleeve capable of transmitting light positioned within said housing so as to be spaced from said diaphragm, said sleeve having an end located adjacent to said end of said housing and another end located remote from said end of said housing and having an opening connecting said ends of said sleeve; an electrode terminal located within said housing adjacent to said other end of said sleeve and to said opening; an electrically conductive material capable of transmitting light located on said other end of said sleeve, said material extending around said opening, being electrically connected to said housing, and being spaced from said terminal; and a charging pin secured to said diaphragm so as to be carried thereby, said charging pin extending from said diaphragm into said opening within said sleeve, said diaphragm being capable of being deformed so as to move said charging pin through said sleeve into contact with said terminal.

11. A dosimeter which includes: a tubular metal housing having an end; a flexible diaphragm capable of transmitting light extending across the interior of said end of said housing; an electrically non-conductive guide sleeve capable of transmitting light positioned within said housing so as to be spaced from said diaphragm, said sleeve having an end located adjacent to said end of said housing and another end located remote from said end of said housing and having an opening connecting said ends of said sleeve; a resilient metal electrode terminal located within said housing adjacent to said other end of said sleeve and to said opening; an electrically conductive material capable of transmitting light located on said other end of said sleeve, said material extending around said opening, being electrically connected to said housing, and being spaced from said terminal; and a charging pin secured to said diaphragm so as to be carried thereby, said charging pin extending from said diaphragm into said opening within said sleeve and having a pointed end located adjacent to said electrode terminal, said diaphragm being capable of being deformed so as to move said charging pin so that said pointed end contacts said terminal.

References Cited in the file of this patent

UNITED STATES PATENTS

| | | |
|---|---|---|
| 2,638,551 | Landsverk | May 12, 1953 |
| 2,638,552 | Landsverk | May 12, 1953 |
| 2,770,765 | Negus | Nov. 13, 1956 |
| 2,793,297 | Siebentritt | May 21, 1957 |
| 2,793,298 | Landsverk | May 21, 1957 |
| 2,841,716 | Rich | July 1, 1958 |